United States Patent
Ando

[11] Patent Number: 5,961,409
[45] Date of Patent: Oct. 5, 1999

[54] REAR DERAILLEUR FOR A BICYCLE

[75] Inventor: Yoshiaki Ando, Kawachinagano, Japan

[73] Assignee: Shimano, Inc., Osaka, Japan

[21] Appl. No.: 08/993,447

[22] Filed: Dec. 18, 1997

Related U.S. Application Data

[60] Provisional application No. 60/034,417, Dec. 26, 1996.

[51] Int. Cl.⁶ ........................................................ F16H 9/00
[52] U.S. Cl. .................................................. 474/82; 474/80
[58] Field of Search ................................. 474/80, 82, 78, 474/81, 117, 138

[56] References Cited

U.S. PATENT DOCUMENTS

| | | | |
|---|---|---|---|
| 3,364,762 | 1/1968 | Maeda | 74/217 |
| 3,927,904 | 12/1975 | Bergles | 474/82 X |
| 4,030,375 | 6/1977 | Nagano | 474/82 |
| 4,443,208 | 4/1984 | Kozakae | 474/82 |
| 4,610,644 | 9/1986 | Nagano | 474/82 |
| 4,642,072 | 2/1987 | Nagano | 474/82 |
| 4,690,663 | 9/1987 | Nagano | 474/80 |
| 4,692,131 | 9/1987 | Nagano | 474/80 |
| 4,850,940 | 7/1989 | Nagano | 474/80 |
| 5,295,916 | 3/1994 | Chattin | 474/80 X |
| 5,397,273 | 3/1995 | Ando | 474/82 |
| 5,518,456 | 5/1996 | Kojima et al. | 474/82 X |

FOREIGN PATENT DOCUMENTS

| | | | |
|---|---|---|---|
| 655386 A1 | 5/1995 | European Pat. Off. | |
| 8-40342 | 2/1996 | Japan | B62M 9/12 |

Primary Examiner—Tamara L. Graysay
Assistant Examiner—Marcus Charles
Attorney, Agent, or Firm—James A. Deland

[57] ABSTRACT

A rear derailleur includes a transformable linkage mechanism including a base member, two linkage members and a movable member. A chain guide is supported to the movable member and is provided with a guide pulley for guiding the chain among the plurality of sprockets. The linkage members are connected to the base member and to the movable member through connecting pins, wherein the connecting pins are slanted with respect to a plane perpendicular to an axis of the plurality of sprockets so that, when the linkage mechanism is transformed, the chain guide moves axially and radially of the plurality of sprockets. A return spring is provided for biasing the chain guide laterally inwardly with respect to the bicycle. A first horizontal shaft swingably supports the base member to a fixing member of the bicycle, and a second horizontal shaft swingably supports the chain guide to the movable member. A first spring is disposed at the base member for biasing the linkage mechanism in a direction of the guide pulley moving away from the axis of the sprocket assembly, and a second spring is disposed between the chain guide and the movable member for applying tension to the chain. The transformable linkage mechanism and first and second springs cooperate together such that the position of the chain guide is forcibly shifted axially and radially of the sprockets by the transformable linkage mechanism, and the shifted position of the chain guide set by the linkage mechanism is radially adjusted with respect to the plurality of sprockets by the balancing of the first and second springs.

12 Claims, 6 Drawing Sheets

REAR DERAILLEUR FOR A BICYCLE

CROSS REFERENCE TO RELATED APPLICATION

This application claims the benefit of Provisional Application No. 60/034,417, filed Dec. 26, 1996.

BACKGROUND OF THE INVENTION

The present invention is directed to bicycle components and, more particularly, to a low-normal rear derailleur having a double servo pantograph mechanism which moves the guide pulley both axially and radially with respect to the rear sprocket cluster.

Rear derailleurs having a double servo pantograph mechanism which moves the derailleur guide pulley both axially and radially of the rear sprocket cluster are known from U.S. Pat. No. 4,610,644. The derailleur shown in FIG. 1 of that patent comprises a transformable linkage mechanism comprising a base member 2, two linkage members 3 and 4 and a movable member 5; and a chain guide 6 having a guide pulley 61 and a tension pulley 62. The linkage members 3 and 4 are slanted relative to a plane perpendicular to the axis of the rear sprocket assembly so that the guide pulley moves radially as well as axially when the transformable linkage mechanism is operated. A first spring 14 is disposed between the base member 2 and the fixing member 1, and a second spring 13 is disposed between the movable member 5 and the chain guide 6. When the transformable linkage mechanism moves the guide pulley 61 axially and radially of the rear sprocket assembly S, the first and second springs 14 and 13 balance with each other to set the positions of the base member 2 and movable member 5 to further set the radial position of the guide pulley 61 relative to the rear sprocket assembly S.

By adjusting the angle of the linkage members 3 and 4 and the tension of the springs 13 and 14, a substantially constant and short chain gap (the distance between the guide pulley 61 and the selected sprocket in the rear sprocket assembly S) can be obtained. This, in turn, allows smooth shifting of the derailleur by eliminating the requirement of overshifting the chain when shifting the chain from one sprocket to another. Overshifting refers to the phenomenon where the guide pulley must be moved beyond the destination sprocket before the chain will engage the destination sprocket. Overshifting is not desirable because it creates the risk that the chain will rasp against or derail from the destination sprocket.

A typical derailleur which employs the teachings of the above-noted patent ordinarily has a return spring which biases the transformable linkage mechanism so that the chain guide is forced towards the smallest sprocket in the rear sprocket cluster. This type of derailleur is called a high-normal derailleur. Thus, when the chain is to be shifted to a larger sprocket, which is usually required when the cyclist is ascending a hill or navigating rough terrain, the manual shift control must operate against the force of the return spring. In many cases the force of the return spring is quite high, so the cyclist must exert substantial effort to shift the derailleur. The effort is further increased when the derailleur must be shifted under load, as often occurs when the cyclist is ascending a hill. This can be quite bothersome to the cyclist when he or she is already exerting substantial effort to overcome the hill or rough terrain. Additionally, when the bicycle is being operated under a severe load with a conventional high-normal derailleur, the chain sometimes skips around the destination sprocket and fails to properly mesh with the destination sprocket. As a result, the cyclist must reduce the pedaling effort to allow the chain to properly mesh with the destination sprocket. Understandably, the resulting delay can be devastating to a high performance cyclist during a competitive event.

Another disadvantage of known high-normal rear derailleurs is that the shift lever used to operate the rear derailleur must be rotated in a direction opposite the direction of rotation of the shift lever used to shift the front derailleur to accomplish the same result. For example, if the cyclist wishes to shift to an easier gear he or she must either rotate the front derailleur shift lever downwardly or rotate the rear derailleur shift lever upwardly. This opposite motion can be confusing to people who are not very experienced with bicycle operation.

SUMMARY OF THE INVENTION

The present invention is directed to a low-normal rear derailleur having a double servo pantograph mechanism which moves the guide pulley both axially and radially with respect to the rear sprocket cluster. By constructing such a derailleur with a return spring that biases the chain guide toward the largest sprocket in the rear sprocket assembly, the effort required to shift the derailleur to a larger sprocket is substantially decreased. The front and rear shift levers operate in the same direction to accomplish the same result, and it has been found that skipping of the chain around the destination sprocket is minimized, if not eliminated entirely.

In one embodiment of the present invention, a rear derailleur includes a transformable linkage mechanism including a base member, two linkage members and a movable member. A chain guide is supported to the movable member and is provided with a guide pulley for guiding the chain among the plurality of sprockets. The linkage members are connected to the base member and to the movable member through connecting pins, wherein the connecting pins are slanted with respect to a plane perpendicular to an axis of the plurality of sprockets so that, when the linkage mechanism is transformed, the chain guide moves axially and radially of the plurality of sprockets. A return spring is provided for biasing the chain guide laterally inwardly with respect to the bicycle. A first horizontal shaft swingably supports the base member to a fixing member of the bicycle, and a second horizontal shaft swingably supports the chain guide to the movable member. A first spring is disposed between the base member and the first horizontal shaft for biasing the linkage mechanism in a direction of the guide pulley moving away from the axis of the sprocket assembly, and a second spring is disposed between the chain guide and the movable member for applying tension to the chain. The transformable linkage mechanism and first and second springs cooperate together such that the position of the chain guide is forcibly shifted axially and radially of the sprockets by the transformable linkage mechanism, and the shifted position of the chain guide set by the linkage mechanism is radially adjusted with respect to the plurality of sprockets by the balancing of the first and second springs.

If desired, the derailleur may include an adjustment mechanism for adjusting a twist angle of the first spring, and a bearing may be disposed between the first horizontal shaft and the base member for stably supporting the base member on the shaft. To form the adjusting mechanism, the base member may have a first stopper, and a stopper plate may be rotatably mounted on the first horizontal shaft. The stopper includes a positioning nose adapted to be positioned relative to an abutting projection that is fixed relative to a bicycle frame and a second stopper for abutting against the first stopper on the base member. The adjusting mechanism then may comprise an adjusting screw disposed between the positioning nose and the abutting projection for varying the relative position between the abutting projection and the positioning nose to thereby adjust the twist angle of the first spring. To facilitate operation in rough terrain, a groove may be formed in the base member for receiving the stopper on the stopper plate so as not to interfere with rotation of the base member relative to the stopper plate.

BRIEF DESCRIPTION OF THE DRAWINGS

FIGS. 3 and 4 are illustrations of the operation of the derailleur shown in FIG. 1;

DETAILED DESCRIPTION OF THE EMBODIMENTS

Figure 1:
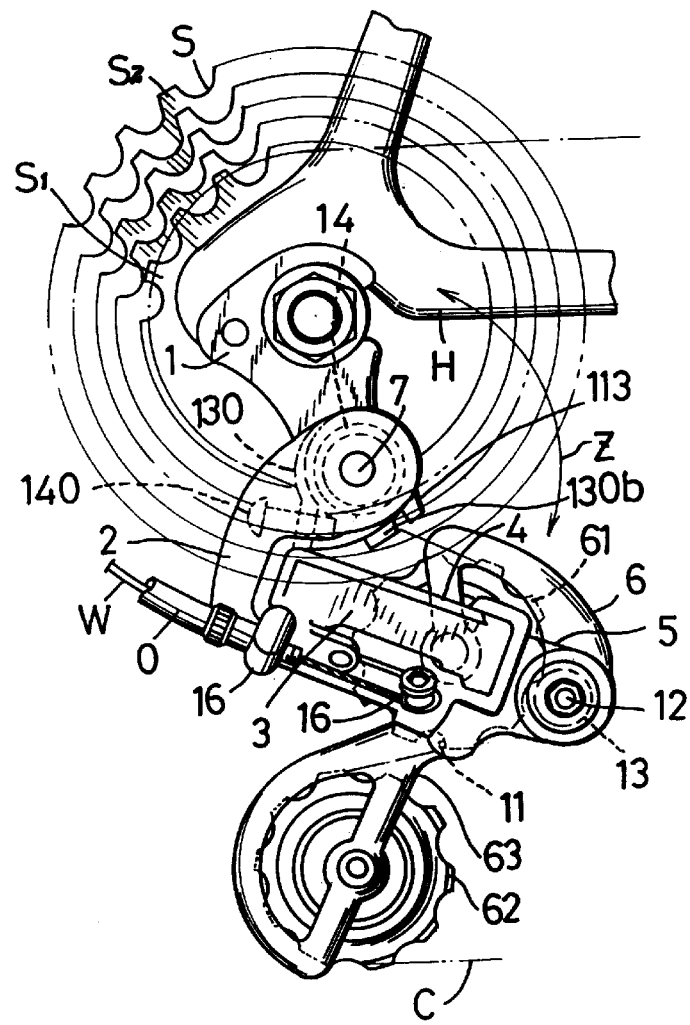
FIG. 1 is a side view of a particular embodiment of a rear derailleur according to the present invention mounted to a bicycle frame showing the position of the derailleur relative to a multistage sprocket assembly.
Figure 2:
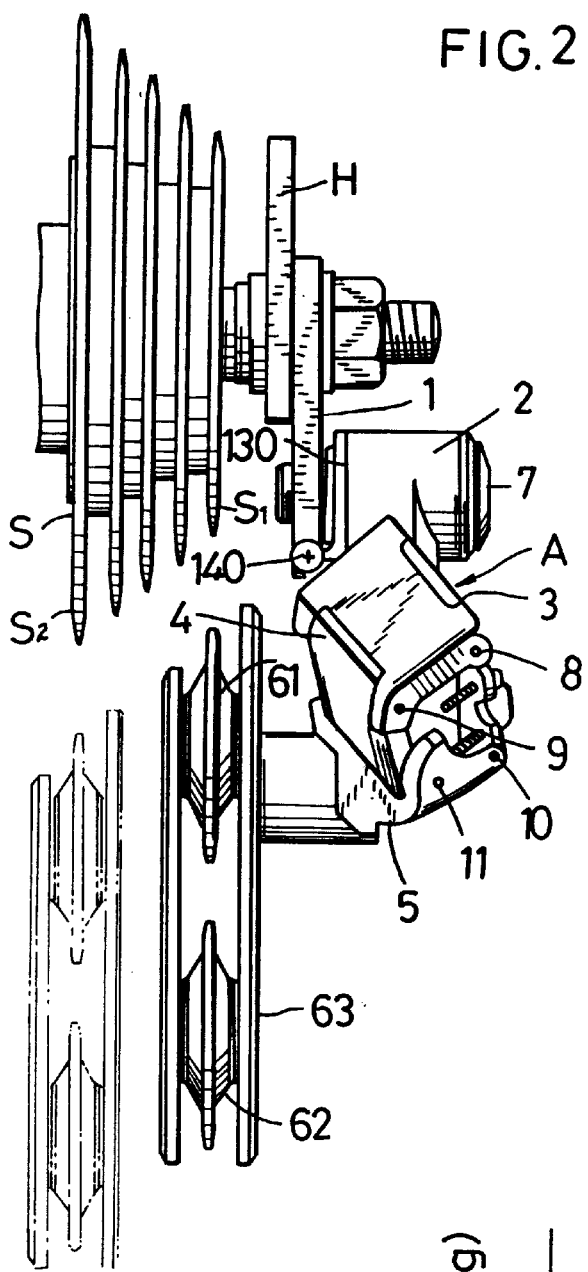
FIG. 2 is a rear view of the derailleur shown in FIG. 1.

FIG. 1 is a side view of a particular embodiment of a rear derailleur according to the present invention mounted to a bicycle frame showing the position of the derailleur relative to a multistage sprocket assembly. The rear derailleur is a modification of the rear derailleurs shown in U.S. Pat. Nos. 4,610,644 and 4,690,663, both incorporated herein by reference. As shown in FIGS. 1 and 2, a rear derailleur according to the present invention comprises a fixing member 1; a pantograph mechanism A comprising a base member 2, two linkage members 3 and 4 and a movable member 5; and a chain guide 6 having a guide pulley 61 and a tension pulley 62.

The fixing member 1 is fixed to a fork end H of the bicycle, and the base member 2 is supported to the fixing member 1 through a first horizontal shaft 7. The base member 2 supports at one side a pair of mounting segments opposite to each other, wherein the linkage members 3 and 4 are pivotably mounted to the mounting segments through a pair of pins 8 and 9. The movable member 5 is pivoted to the opposite free ends of linkage members 3 and 4 through a pair of pins 10 and 11 respectively. The movable member 5 is shaped like the base member 2 and is provided at one side with a pair of mounting segments opposite to each other pivoted to the linkage members 3 and 4. Movable member 5 rotatably supports the chain guide 6 at its other side through a second horizontal shaft 12 parallel to the first shaft 7.

A return spring 70 (FIG. 7) is interposed between the linkage member 3 and 4 and the movable member 5 or base member 2 to thereby bias the chain guide 6 axially of the multistage sprocket assembly toward the largest diameter sprocket S2. In this embodiment, one end of return spring 70 is connected to connecting pin 9 and the other end of return spring 70 is connected to connecting pin 10. Of course, many configurations and connections of return spring 70 may be employed as long as the return spring biases chain guide 6 toward the largest diameter sprocket S2.

In this embodiment, the base member 2 is supported swingably to the fixing member 1 through the first shaft 7 in the relation that the guide pulley 61 moves in reciprocation away from or toward the axis of sprocket assembly S (in the direction of the arrow Z in FIG. 1). Between the fixing member 1 and the base member 2 is provided a first spring 14 biasing the guide pulley 61 to move away from the axis of sprocket assembly S (clockwise in FIG. 1), and between a guide frame 63 of chain guide 6 and the movable member 5 is provided a second spring 13 biasing the chain guide 6 clockwise in FIG. 1 with respect to the movable member 5. An adjusting screw 140 is provided for adjusting a twist angle of first spring 14 as discussed in more detail below. A forcibly moving mechanism is provided which, when the pantograph mechanism A is transformed, moves the guide pulley 61 axially of sprocket assembly S and radially thereof in the plane perpendicular to the axis of the same. The forcibly moving mechanism has the connecting pins 8, 9, 10 and 11 slanted to the plane perpendicular to the axis of sprocket assembly S so that, when the pantograph mechanism A is transformed, the chain guide 6 is moved axially of sprocket assembly S and also radially thereof in the plane perpendicular to the axis of the same. The guide frame 63 is supported swingably to the movable member 5 at a position apart from the axis of guide pulley 61, thereby forming a so-called triangular balance.

In this embodiment, the path of guide pulley 61 moved by the forcibly moving mechanism across the smaller diameter sprocket S1 and larger diameter sprocket S2 is so constructed that an interval between the guide pulley 61 and the sprocket S2 is made larger than the interval between the same and the sprocket S1 as shown in FIGS. 3 and 4. Hence, the resilience of first spring 14, when the guide pulley 61 corresponds to the larger diameter sprocket S2, is made larger than that of the first spring 14 when the same corresponds to the smaller diameter sprocket S1.

Figure 5:
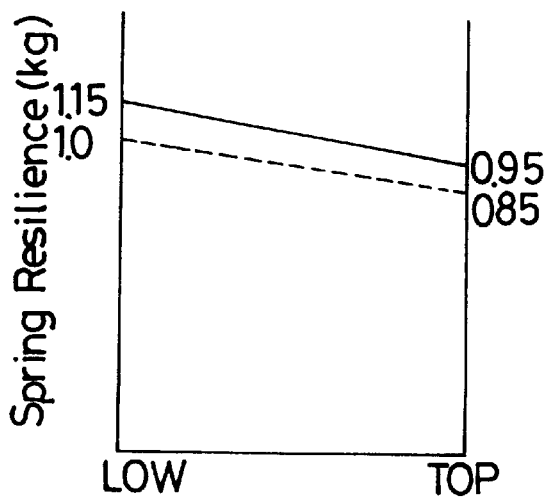
FIG. 5 is an illustration of a particular embodiment of spring characteristics of first and second springs used in the derailleur shown in FIG. 1.

The first and second springs 14 and 13 balance with each other to adjust the guide pulley 61 in position set radially of sprocket assembly S by the forcibly moving mechanism through the slanted pins 8 and 11, the second spring 13 giving tension to the chain and being smaller in the spring force than the first spring 14. The resilience of spring 13, when the guide pulley 61 corresponds to the sprocket S2 through the swinging motion of chain guide 6, is made larger than that with respect to the sprocket S1 as shown by the dotted line in FIG. 5, thereby giving constant tension to the chain.

Although the first spring 14 biases the guide pulley 61 clockwise in FIG. 1, in other words, away from the axis of sprocket assembly S, the resilience, when the guide pulley 61 corresponds to the larger diameter sprocket S2, is made larger than that when the same corresponds to the smaller sprocket S1, because the forcibly moving mechanism forcibly moves the guide pulley 61 away from the sprocket S2 corresponding thereto so that the first spring 14 balances with the second spring 13 to swing the pantograph mechanism A counterclockwise in FIG. 1. The counterclockwise swinging motion of pantograph mechanism A allows the guide pulley 61 to approach the larger diameter sprocket S2 as shown in FIGS. 3 and 4.

The first and second springs 14 and 13 are formed as coiled springs and are wound at intermediate portions on the horizontal shafts 12 and 7 respectively, the second spring 13 being retained at one end to the chain guide 6 and at the other end to the movable member 5, the first spring 14 being retained at one end to a stopper plate 130 discussed in more detail below and at the other end to the base member 2.

The chain guide 6 comprises the guide pulley 61, tension pulley 62, and a guide frame 63 carrying the pulleys 61 and 62, so that the guide and tension pulleys 61 and 62 are supported, at the positions where a triangular is formed around the pivot position of guide frame 63, to the movable member 5 through the horizontal shaft 12, thereby forming the so-called triangular balance. The pulleys 61 and 62 carry the chain C as shown by the chain line in FIG. 1 and the guide pulley 61 guides the chain C to a desired one sprocket in the sprocket assembly S comprising five sprockets as shown.

Figure 7:
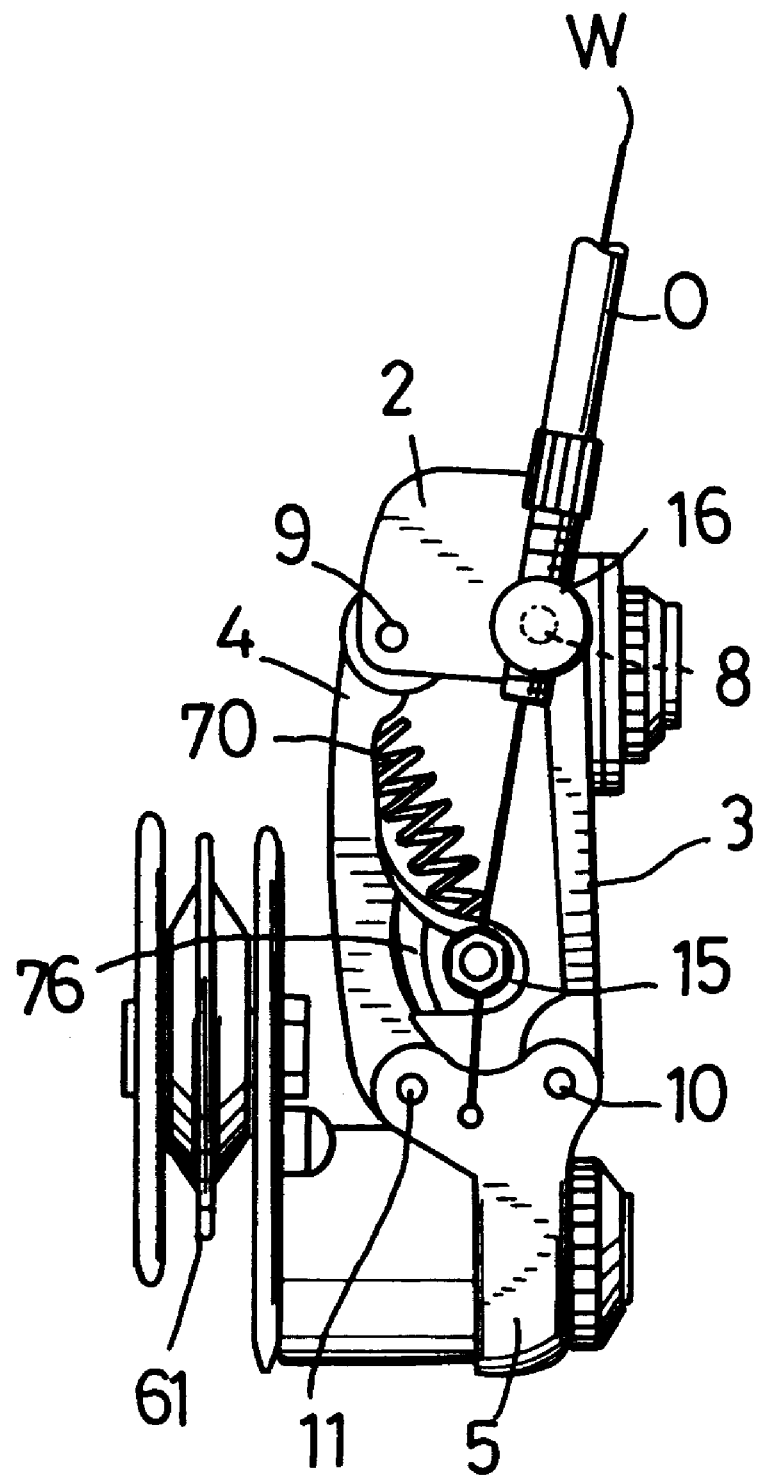
FIG. 7 is a more detailed view of the derailleur showing a particular embodiment of a return spring.

As shown more clearly in FIG. 7, a control wire W is mounted to a mounting arm 76 extending from link 4 through a fixture 15. An outer sheath 0 guiding the wire W is supported to a support 16 at the pin 8.

Figure 8:
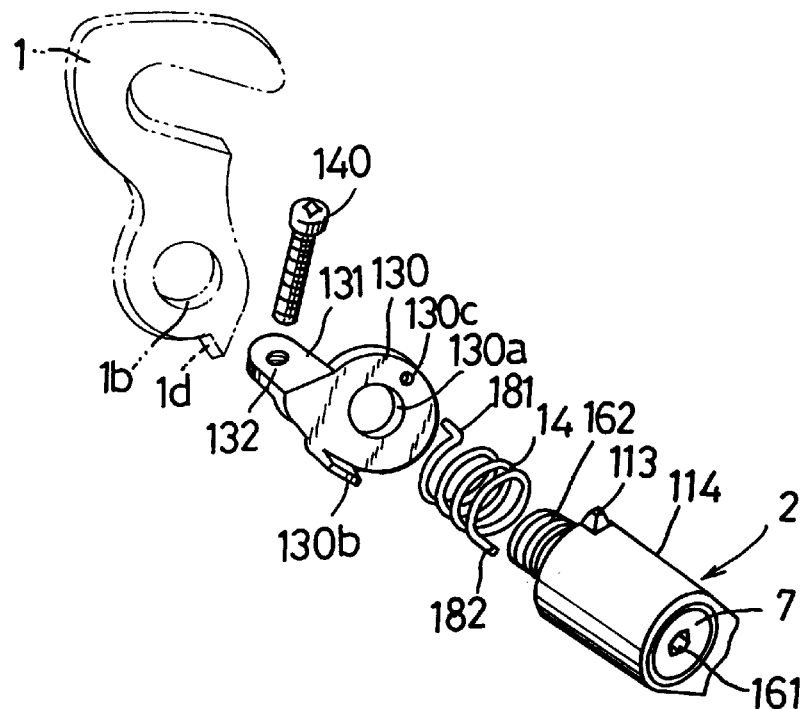
FIG. 8 is an exploded view of a particular embodiment of a spring adjusting mechanism used in the derailleur shown in FIG. 1.
Figure 9:
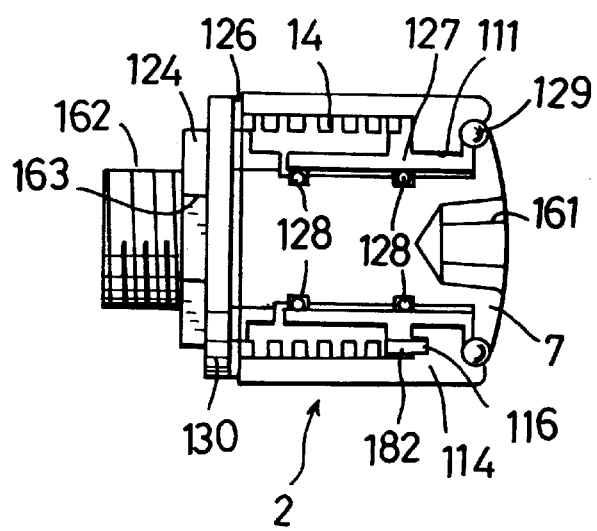
FIG. 9 is a cross sectional view of the base member and spring adjusting mechanism shown in FIG. 8.

The structure of base member 2, first spring 14, stopper plate 130 and adjusting screw 140 is shown in more detail in FIGS. 8 and 9. The base member 2 is provided at one lengthwise end thereof with a boss 114 having a through-bore 111 for rotatably supporting therein the first horizontal shaft 7, a cavity 112 receiving therein the first spring 14, and a first stopper 113. The first horizontal shaft 7, as shown in FIG. 9, is provided at its head with a flange and a rotary control 161 and at the outer periphery of its utmost end with a screw thread 162 and an annular groove 163. Screw thread 162 screws with a threaded bore 1b at the fixing member 1, thereby fixing the first horizontal shaft 7 thereto.

Stopper plate 130 is rotatably supported to the first horizontal shaft 7, and it has a positioning nose 131 opposite to an abutting projection 1a at the fixing member 1. The first spring 14, as shown in FIG. 1, comprises a coiled portion and first and second spring ends 181 and 182 extending axially from the both ends of the coiled portion. First end 181 of the first spring 14 is retained in a retaining bore 130c in stopper plate 130, and the second end 182 of first spring 14 is retained in a retaining bore 116 provided in base member 2. Positioning nose 131 has a wide support face opposite to the abutting projection 1a and a threaded bore 132 with which adjusting screw 140 is threaded. In this embodiment, adjusting screw 140 abuts against the abutting projection 1a so as to adjust a twist angle of the first spring 14.

Stopper plate 130 comprises a round plate having at the center a through-bore 130a and at one side a second stopper 130b extending away from fixing member 1 and positioned opposite to the first stopper 113 at the base member 2. First spring 14 is coiled so that second stopper 130b on stopper plate 130 abuts against the first stopper 130b on the boss 114. The through-bore 130a of stopper plate 130 is fitted onto the outer periphery of the utmost end of the first horizontal shaft 7 so that the stopper plate 130 is supported rotatably thereto. The axial movement of stopper plate 130 is blocked by a snap ring 124 fitted into the annular groove 163. Hence, even when the first horizontal shaft 7 is screwed into threaded opening 1b of fixing member 1, stopper plate 130 can still rotate. A bush 126 of synthetic resin is disposed between first horizontal shaft 7 and boss 114 adjacent to stopper plate 130 to prevent contaminants from entering space 112. A seal 129 is disposed on the other end of shaft 7 for the same purpose. Another bush 127 supports bearings 128 such as roller or friction bearings for stably supporting boss 114 on first horizontal shaft 7 and to reduce rotational resistance.

Figure 10:
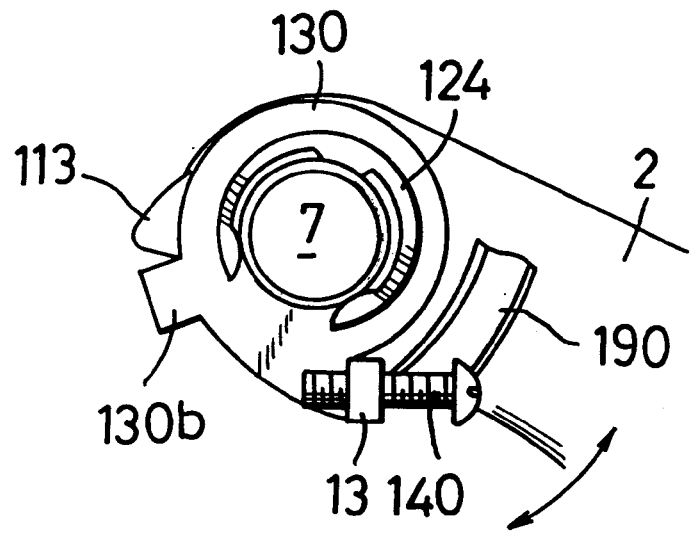
FIG. 10 is a detailed view showing a particular embodiment of a groove in the base member.
Figure 11:
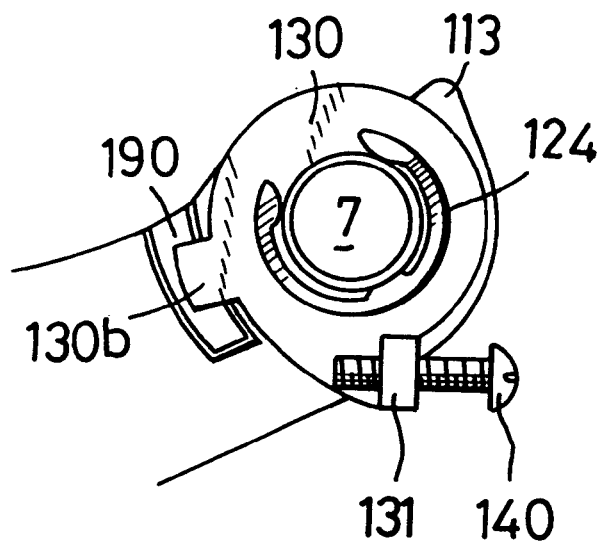
FIG. 11 is a detailed view showing how the groove in the base member receives a stopper member formed in the stopper plate shown in FIG. 8.

As shown in FIGS. 10 and 11, base member 2 includes a groove 190 that extends in a circumferential direction at substantially the same radius from the center of first horizontal shaft 7 as stopper 130b. Groove 190 has a depth sufficient to freely receive stopper 130b therein should base member 2 swing by a wide angle as shown in FIG. 11. Such swinging may occur during vigorous riding over extremely rough terrain as discussed in more detail below.

The rear derailleur constructed as described above is mounted on the fixing member 1 such that the first horizontal shaft 7 screws into the threaded bore 1b at the fixing member 1 to allow the adjusting screw 140 to abut at its tip against the abutting projection 1a at the fixing member 1. Hence, the first horizontal shaft 7 is fixed to the fixing member 1, but the stopper plate 130 is not fixed thereto as a result of the snap ring 124 to thereby be kept rotatable with respect to the first horizontal shaft 7. Thus, base member 2 is mounted on the fixing member 1 swingably with respect to the first horizontal shaft 7.

In such mounting condition, the first spring 14 is given a predetermined twist angle, the first stopper 113 at the base member 2 abuts against the second stopper 130b at the stopper plate 130 by means of the spring reaction of spring 14, and the base member 2 is mounted on the fixing member 1 at a predetermined angle with respect to the axis of a hub shaft as shown in FIG. 1, thus setting the initial position of the derailleur body. When the driving chain engages with the guide and tension sprockets 61 and 62, the base member 2 swings counterclockwise in FIG. 1 against the biasing force of first spring 14 and the chain guide 6 swings similarly against the second spring 13, whereby the first stopper 113 moves counterclockwise away from the second stopper 130b.

If the derailleur body is mounted on the fixing member 1 with an improper mounting angle with respect to the axis of the hub shaft, the adjusting screw 140 can be rotatably operated by a common tool, such as a screw driver, so as to rotate the stopper plate 130 with respect to the first horizontal shaft 7 and shift the positioning nose 131 at the stopper plate 130 with respect to the abutting projection 1a at the fixing member 1, thereby enabling the twist angle of the first spring 14 to be adjusted. As a result, the chain guide 6 can be corrected to be in the proper position with respect to each rear chain gear S, thereby improving the speed change efficiency.

The operation of the derailleur during riding is as follows.

Referring to FIGS. 1 and 2, the chain guide 6 is initially positioned corresponding to the smaller diameter sprocket S1. The control wire W is released to transform the pantograph mechanism A (via return spring 70) so that the forcibly moving mechanism with the slanted pins 8 through 11 moves the chain guide 6 axially of sprocket assembly S toward sprocket S2 and also radially thereof in the plane perpendicular to the axis of sprocket assembly S.

At this time, the first and second springs 14 and 13 balance with each other to actuate the pantograph mechanism A with respect to the fixing member 1 and the chain guide 6 with respect to the movable member 5. Hence, the guide pulley 61 as shown in the dotted lines in FIGS. 3 and 4 is adjusted in position radially of sprocket assembly S with respect to the position set by the forcibly moving mechanism.

In detail, when the pantograph mechanism A is transformed, the forcibly moving mechanism moves the chain guide 6 together with the movable member 5 axially of sprocket assembly S and toward the larger diameter sprocket S2 and also radially outwardly thereof and then the interval 12 between the guide pulley 61 and the larger diameter sprocket S2 becomes larger than 11 between the same and the smaller diameter sprocket S1.

Figure 6:
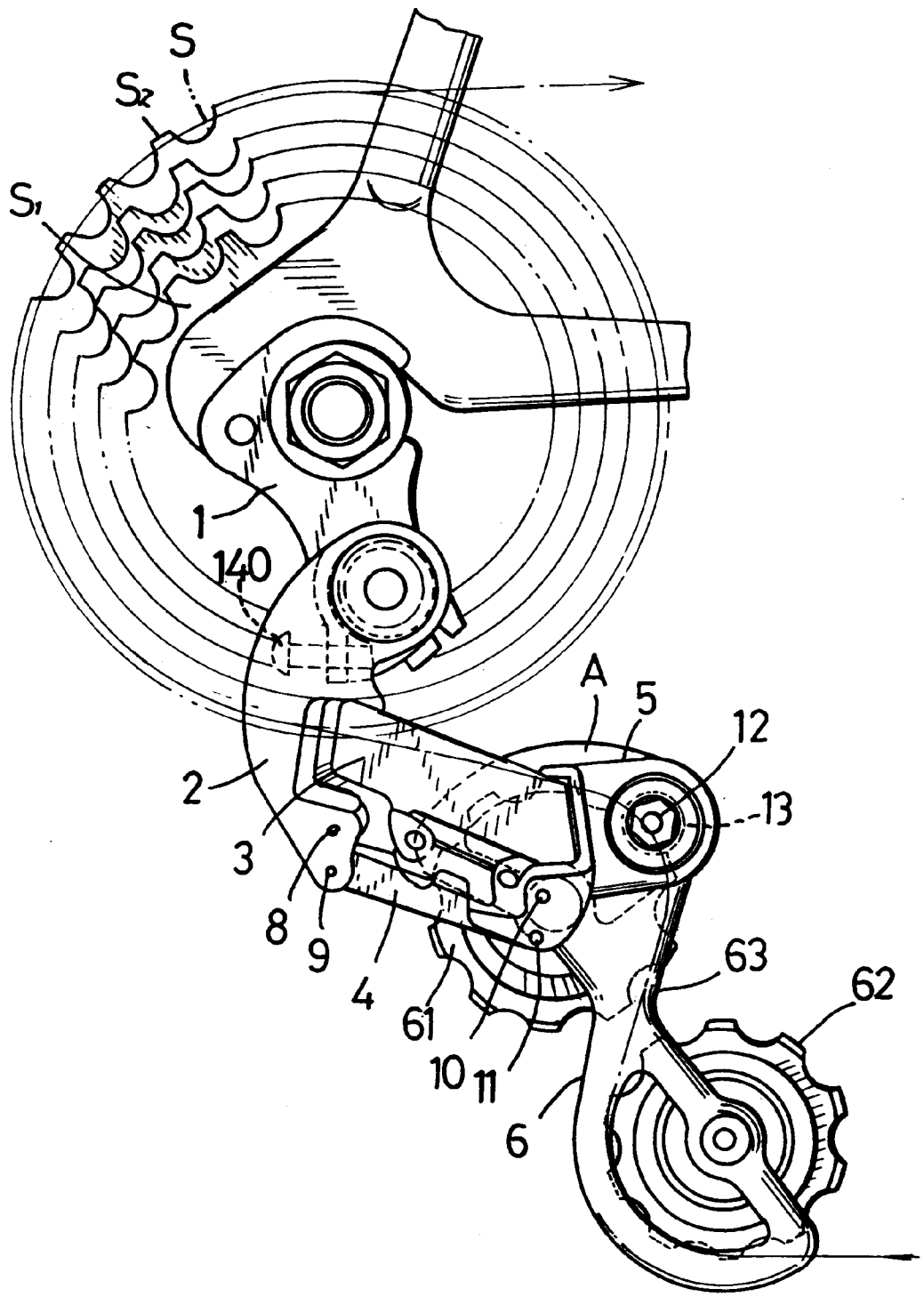
FIG. 6 is a side view of the derailleur illustrated in FIG. 1 showing transformation of the linkage mechanism.

Therefore, the second spring 13 which applies tension to the chain C deflects more to that extent and increases its resilience, and overcomes the first spring 14 to swing the pantograph mechanism A counterclockwise from the position in FIG. 1 to that in FIG. 6, whereby the guide pulley 61 approaches the larger diameter sprocket S2. As a result, the guide pulley 61, as shown in FIGS. 3 and 4, is adjusted in position with respect to the larger diameter sprocket S2. When the pantograph mechanism A swings, the first spring 14 deflects to increase its resilience, the swinging motion of pantograph mechanism A depending on the balance between the first and second springs 14 and 13.

The control wire W is then pulled so that the forcibly moving mechanism with the slanted pins 8 to 11 moves the chain guide 6 axially of sprocket assembly S toward sprocket S1 and also radially inwardly thereof in the plane perpendicular to the axis of the same. In this case, the first and second springs 14 and 13 also balance with each other so that the pantograph mechanism A operates with respect to the fixing member 1 and the chain guide 6 operates with respect to the movable member 5.

In other words, when the pantograph mechanism A is transformed toward the smaller diameter sprocket S1, conversely to the above, the forcibly moving mechanism allows the guide pulley 61 to move close to the smaller diameter sprocket S1 and it moves to the sprocket S1. Hence, an amount of deflection of the second spring 13 is reduced and the first spring 14 overcomes the second spring 13 to return the pantograph mechanism A clockwise with respect to the fixing member 1. Such swinging motion of pantograph mechanism A causes the guide pulley 61 to move away from the smaller diameter sprocket S1, but the forcibly moving mechanism can set the pulley 61 at the smallest interval needed with respect to the sprocket S1.

Even when the guide pulley 61 is positioned corresponding to the smaller diameter sprocket S1 in the top speed stage, the first and second springs 14 and 13 may be changed in the spring forces thereof to allow the pantograph mechanism A to swing counterclockwise from the position shown in FIG. 1, thereby enabling the guide pulley 61 to further approach the smaller diameter sprocket S1. In this case, when the guide pulley 61 is positioned corresponding to the larger diameter sprocket S2 in the low speed stage, the resilience of the first spring 13 increases, whereby the pantograph mechanism A may, of course, largely swing counterclockwise.

In any case, the forcibly moving mechanism can forcibly move the chain guide 6 in the specific direction and the first and second springs 14 and 13 balance with each other to swing the pantograph mechanism A with respect to the fixing member 1, thereby enabling the guide pulley 61 to operate corresponding to the sprocket arrangement at the sprocket assembly S. Accordingly, the moving direction of chain guide 6 by the forcibly moving mechanism can be set to reduce the interval between the guide pulley 61 and the smaller diameter one S1 and increase that between the same and the larger diameter sprocket S2 corresponding to the arrangement of the largest diameter sprocket applicable in practical use. Hence, even when the sprocket assembly changes in arrangement of sprockets from FIG. 3 to FIG. 4, a difference in diameter between both the larger and smaller diameter sprockets is especially larger, or the larger diameter sprocket is of diameter larger than the predetermined value, the interval between the guide pulley 61 and each sprocket can be kept in a properly allowable range, thereby improving the speed change efficiency.

If the bicycle is being ridden vigorously over very rough terrain, the chain extending from the tension pulley 61 to the front chainwheel attached to the pedals tends to flap up and down wildly. This, in turn, tends to cause the base member 2 to pivot back and forth around first horizontal shaft 7 by a very wide angle. As a result, there is the risk that second stopper 130b on stopper plate 130 will strike base member 2. When this occurs, the pantograph mechanism tends to move laterally outwardly towards the smaller sprocket S1 which could cause unintended shifting to a smaller sprocket. Groove 190 discussed above with respect to FIGS. 10 and 11 prevents stopper 130b from striking base member 2, thus allowing the shocks to be absorbed by spring 14 and bush 126 and preventing such unintended shifts.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims.

What is claimed is:

1. A derailleur for selectively shifting a driving chain among a plurality of sprockets coaxially mounted to a rear wheel of a bicycle, comprising:

a transformable linkage mechanism including a base member, two linkage members and a movable member;

a chain guide supported to the movable member and provided with a guide pulley for guiding the chain among the plurality of sprockets;

wherein the linkage members are connected to the base member and to the movable member through connecting pins, wherein the connecting pins are slanted toward a plane perpendicular to an axis of the plurality of sprockets so that, when the linkage mechanism is transformed, the chain guide moves axially and radially of the plurality of sprockets;

a return spring for constantly biasing the chain guide laterally inwardly with respect to the bicycle;

a first horizontal shaft for swingably supporting the base member to a fixing member of the bicycle;

a second horizontal shaft for swingably supporting the chain guide to the movable member;

a first spring disposed at the base member for biasing the linkage mechanism in a direction of the guide pulley moving away from the axis of the sprocket assembly;

a second spring disposed between the chain guide and the movable member for applying tension to the chain;

wherein the transformable linkage mechanism and first and second springs cooperate together such that the position of the chain guide is forcibly shifted axially and radially of the sprockets by the transformable linkage mechanism and the shifted position of the chain guide set by the linkage mechanism is radially adjusted with respect to the plurality of sprockets by the balancing of the first and second springs.

2. The derailleur according to claim 1 further comprising a bearing disposed between the first horizontal shaft and the base member.

3. The derailleur according to claim 1 wherein the base member has a first stopper, and further comprising a stopper plate rotatably mounted on the first horizontal shaft, wherein the stopper plate includes:

a positioning nose adapted to be positioned relative to an abutting projection that is fixed relative to a bicycle frame; and a second stopper for abutting against the first stopper on the base member.

4. The derailleur according to claim 3 further comprising an adjusting mechanism for changing the position of the positioning nose with respect to the abutting projection to thereby adjust a twist angle of the first spring.

5. The derailleur according to claim 4 wherein the adjusting mechanism comprises an adjusting screw which contacts the positioning nose.

6. The derailleur according to claim 5 wherein the adjusting screw is disposed between the positioning nose and the abutting projection.

7. The derailleur according to claim 6 wherein the adjusting screw is threaded into the positioning nose.

8. The derailleur according to claim 3 wherein the base member includes a groove for receiving the second stopper on the stopper plate when the second stopper moves away from the first stopper on the base member.

9. The derailleur according to claim 8 further comprising an adjusting mechanism for changing the position of the positioning nose with respect to the abutting projection to thereby adjust a twist angle of the first spring.

10. The derailleur according to claim 9 wherein the adjusting mechanism comprises an adjusting screw which contacts the positioning nose.

11. The derailleur according to claim 10 wherein the adjusting screw is disposed between the positioning nose and the abutting projection.

12. The derailleur according to claim 11 wherein the adjusting screw is threaded into the positioning nose.

* * * * *